Nov. 11, 1969   E. W. HOWE   3,477,297
CAGING APPARATUS AND SENSOR STABILIZATION SYSTEM EMPLOYING SAME
Filed Oct. 6, 1966   4 Sheets-Sheet 1

INVENTOR:
EDWIN W. HOWE
BY Howson & Howson
ATTYS.

Nov. 11, 1969         E. W. HOWE         3,477,297
CAGING APPARATUS AND SENSOR STABILIZATION SYSTEM EMPLOYING SAME
Filed Oct. 6, 1966                       4 Sheets-Sheet 2
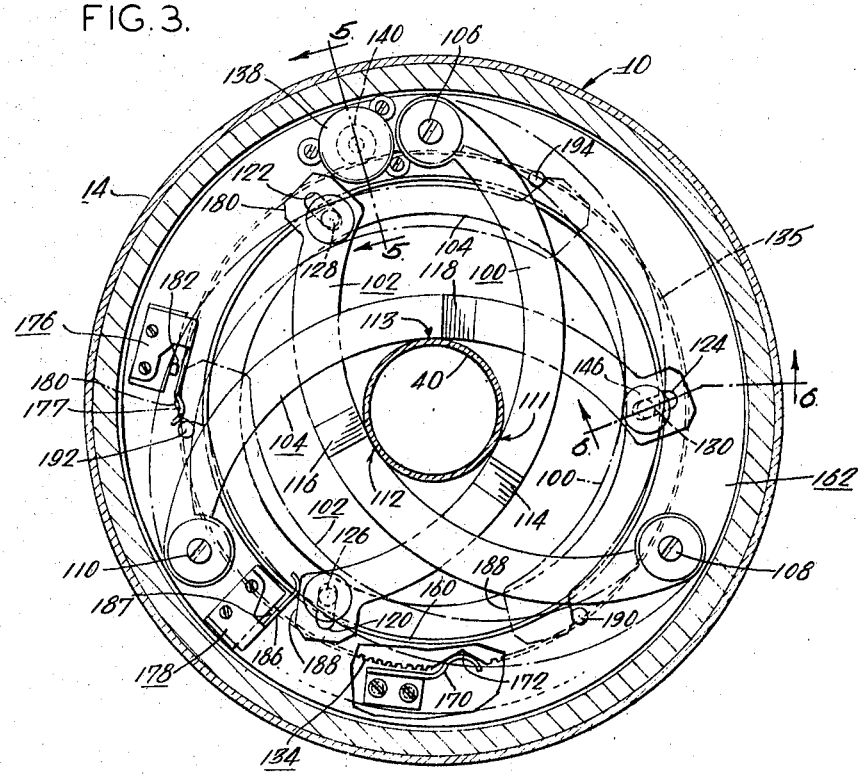
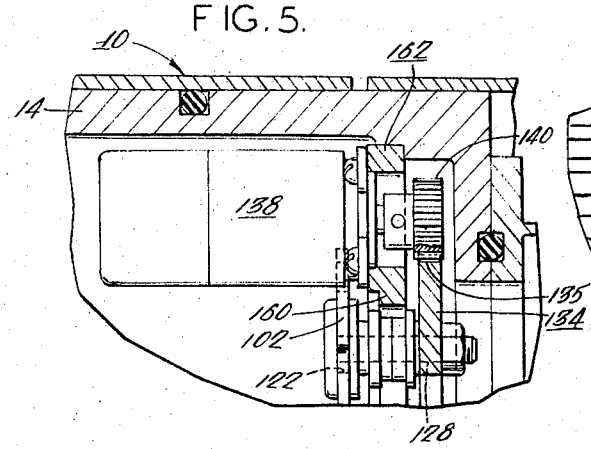
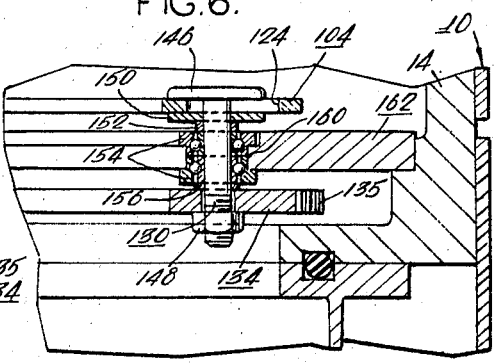
INVENTOR:
EDWIN W. HOWE
BY
Howson & Howson
ATTYS.

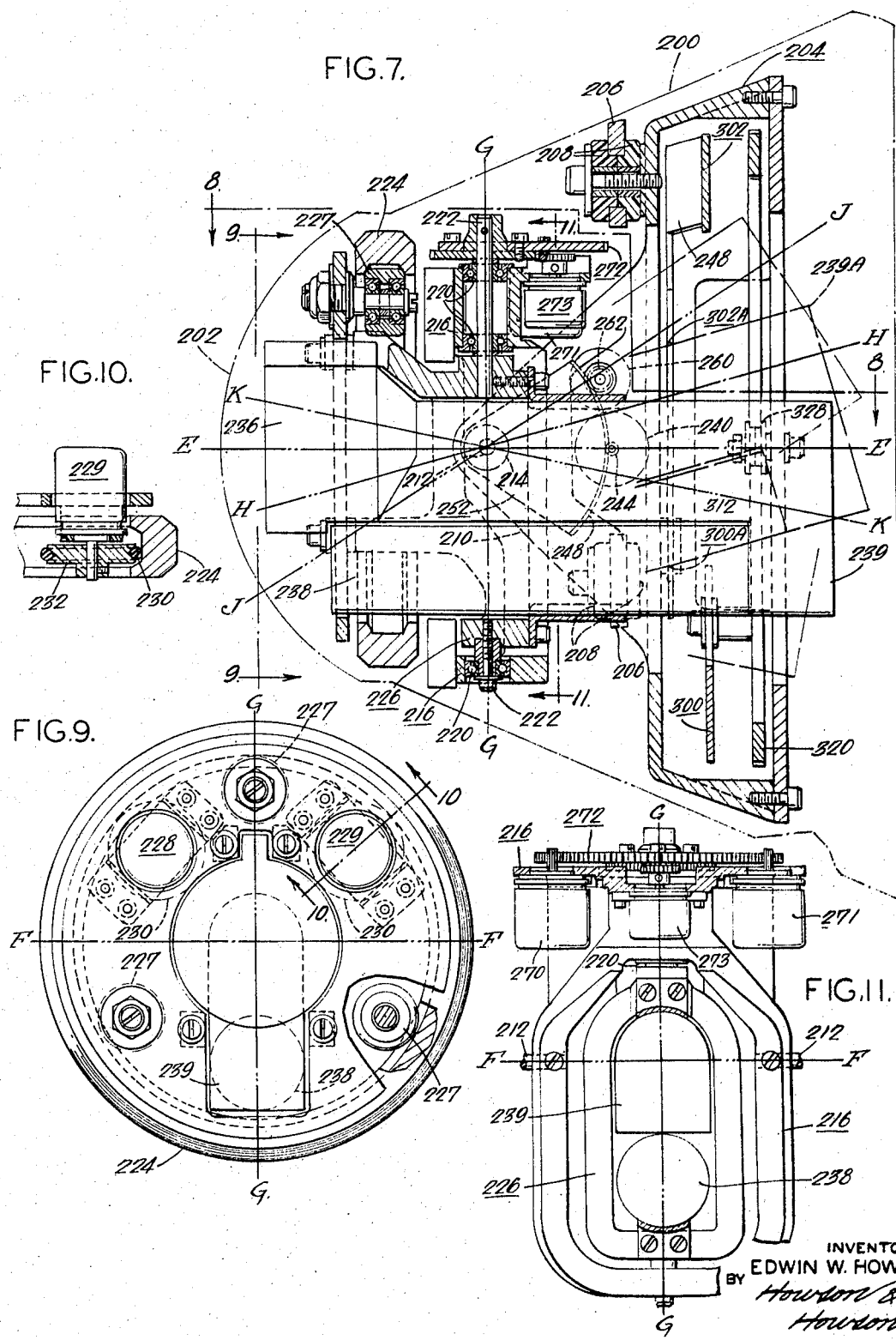

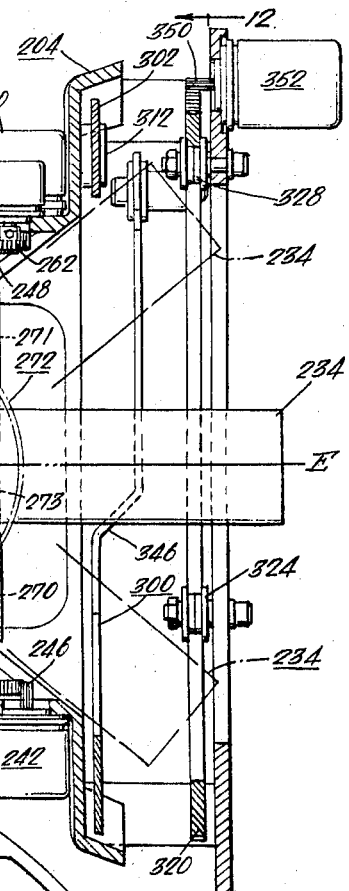

United States Patent Office

3,477,297
Patented Nov. 11, 1969

3,477,297
CAGING APPARATUS AND SENSOR STABILIZATION SYSTEM EMPLOYING SAME
Edwin W. Howe, North Baldwin, N.Y., assignor to AMBAC Industries, Incorporated, New York, N.Y.
Filed Oct. 6, 1966, Ser. No. 584,840
Int. Cl. G01c *19/24*
U.S. Cl. 74—5.1         7 Claims

ABSTRACT OF THE DISCLOSURE

A caging system for a two-degree-of-freedom gyro of the type in which the gyro rotor is mounted on a frame by means of an inner and outer gimbal. In the caged condition, a caging surface on a large central object carried by and fixed to the inner gimbal is contacted simultaneously by a plurality of caging arms pivoted from the frame at points equiangularly-spaced about the caging surface, the arms being pivotable apart to uncage the gyro. The caging arms extend from their pivot points to beyond the caging surface, the ends of the caging arms remote from the pivot points being driven in rotation through corresponding pin-and-slot couplings to a motor-driven ring gear. The ring gear is supported for rotation either by means of three equiangularly-spaced rollers mounted on the frame, which roll on the inner circular surface of the ring gear, or by rollers mounted on each of the pins which roll on the inner circular surface of a ring secured to the frame.

---

This invention relates to novel caging apparatus controlledly operable to place and hold a member in a caged reference angular position and to release it into an uncaged position in which it is free to move angularly. In a more specific aspect, it relates to a sensor stabilization system in which gyroscopically-stabilized sensor apparatus is gimbal-mounted on a frame to permit free pivoting of the sensor apparatus about two mutually perpendicular axes with respect to the frame during operation, and is provided with novel caging apparatus for caging and uncaging the sensor apparatus with respect to said frame.

There are a variety of applications in which it is desirable to provide apparatus which will hold a member in a caged reference angular position and controlledly release it for free motion. One such application arises, for example, in connection with a missile in which a sensor of electromagnetic waves or the like is to be mounted so that, when caged, the sensor will maintain a fixed angular position with respect to the missile and when uncaged will be capable of maintaining a fixed orientation in space despite pitching and yawing motion of the missile with respect to it. Various expedients for effecting caging are known, such as a simple pin slidably mounted on the supporting frame which can be advanced into a recess in the member to be caged to hold it in fixed orientation and retracted to uncage the member. However, such caging devices require that the member to be caged be placed in its caged orientation by some other means before the caging apparatus is effective to hold it in its caged position. In many applications it is desirable instead to provide apparatus which, when the member is angularly displaced from its caged position, is operable to move it to its caged position and hold it there as long as desired. For example, in a missile system of the type mentioned above, such apparatus would be effective to cage the sensor apparatus in a fixed position with respect to the missile, to uncage it for gyro-stabilized operation when desired for a period during which it will, in general, depart from its caged position, and, when desired, to move the sensor apparatus back to its caged position and hold it there affirmatively.

Accordingly it is an object of the invention to provide new and useful caging apparatus.

It is also an object to provide a new and useful sensor stabilization system and caging apparatus therefor.

Another object is to provide new and useful caging apparatus which is operative to return the member to be caged to its caged position and to hold it affirmatively in said caged position.

Another object is to provide such caging apparatus including means for providing electrical indications of the caged and uncaged conditions thereof.

A further object is to provide such caging apparatus which is readily operated by a simple mechanical drive mechanism.

Another object is to provide such a caging apparatus which does not require any complicated caging structure on the member to be caged, and is compact and reliable in operation.

In accordance with the invention these and other objects are achieved by the provision of a supporting frame having an opening through which the member to be caged extends. A plurality of caging arms are pivotably mounted at different points on the frame around the member to be caged, the caging arms extending across the opening adjacent different sides of the member to be caged so as to be pivotable into and out of simultaneous contact with different side portions of the member to be caged. The caging arms are moved into and out of simultaneous contact with the member by caging control means which extends between the several caging arms and is linked to them at points spaced from their respective pivot points, so that by appropriate operation of the caging control means the caging arms are moved together toward their caging position in which they simultaneously contact the member to be caged when caging is desired, and are moved out of said simultaneous contact when the member is to be uncaged. The arrangement and configuration of the caging arms is preferably such that after the member is uncaged and displaced from its caged position, the caging arms in moving toward their caging position will affirmatively pick up the member and move it to its caged position. In the preferred embodiment the caging arms are in the nature of an iris diaphragm surrounding the member to be caged.

Releasable latch means are preferably used to affirmatively hold the caging control means in its caged position, and one or more of the caging arms are preferably used to operate an electrical switch when the arms are moved to the caged position and to operate another electrical switch when they have moved to their fully uncaged position, thereby to provide electrical indications of the caged and uncaged conditions.

In a preferred embodiment of the invention the caging apparatus is used in combination with a gyroscopically-stabilized sensor apparatus to cage and uncage the sensor apparatus. For example, the sensor apparatus may comprise a television camera apparatus mounted on a gyroscopically-stabilized support or platform and having a generally cylindrical portion extending between caging arms suspended from the frame, whereby the camera apparatus can be caged in a reference angular position with respect to the frame. The caging arms are preferably pivoted about pivots spaced equiangularly from each other around a circle surrounding the generally cylindrical portion of the camera apparatus and are displaced along the tube from the axis of pivot of the tube; however the caging arms preferably contact the camera in substantially the same plane. In one preferred embodiment three caging arms are used, and in another form two are used; in the latter case each arm preferably has a surface having a radius of curvature smaller than that of the generally cylindrical portion of the sensor apparatus so that each arm contacts the sensor apparatus at two points for greater stability of positioning.

Other objects and features of the invention will be more readily appreciated from a consideration of the following detailed description, taken in connection with the accompanying drawings, in which:

FIGURE 3 is a cross-sectional view of the apparatus shown in FIGURE 1, taken along lines 3—3;

FIGURE 5 is an enlarged fragmentary view, partly in section, taken along lines 5—5 of FIGURE 3;

FIGURE 6 is an enlarged fragmentary view, partly in section, taken along lines 6—6 of FIGURE 3;

FIGURE 7 is a longitudinal sectional view of another form of apparatus in accordance with the invention;

FIGURE 8 is a sectional view of the apparatus of FIGURE 7, taken along lines 8—8;

FIGURE 9 is a view of the apparatus of FIGURE 7, taken along lines 9—9;

FIGURE 10 is a fragmentary view partly in section taken along lines 10—10 of FIGURE 9;

FIGURE 11 is a view taken along lines 11—11 of FIGURE 7;

FIGURE 12 is a view taken along lines 12—12 of FIGURE 8;

FIGURE 13 is a fragmentary sectional view taken along lines 13—13 of FIGURE 12; and FIGURE 14 is a fragmentary sectional view taken along lines 14—14 of FIGURE 12.

Figure 1:
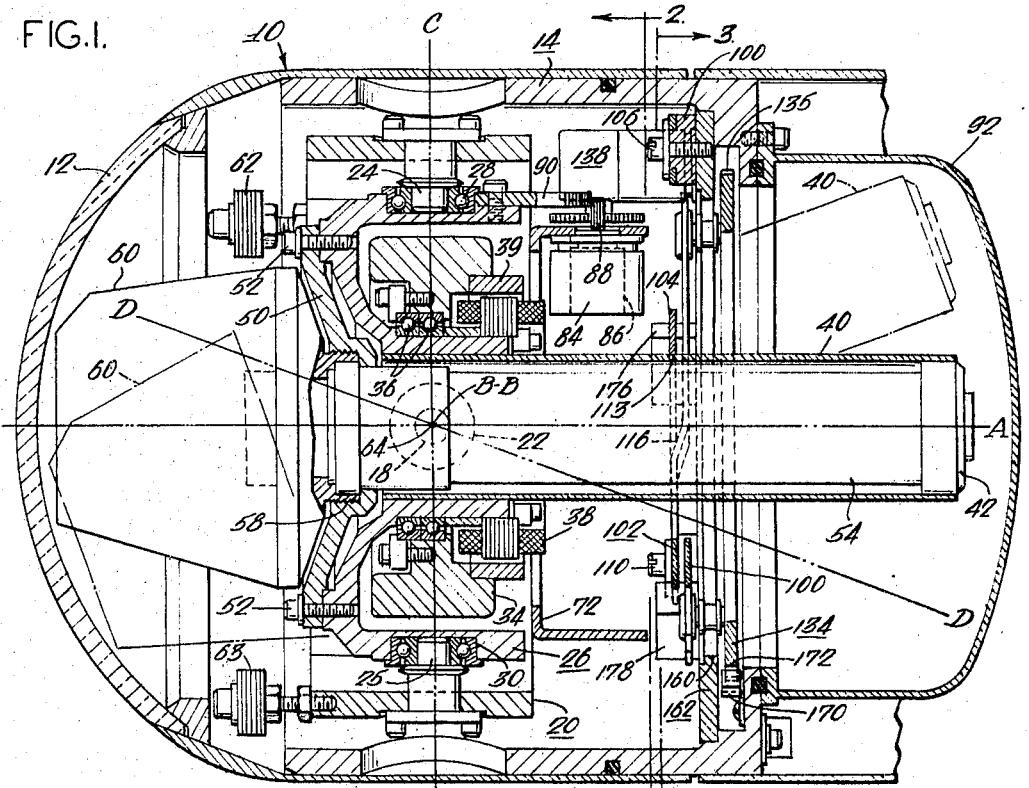
FIGURE 1 is a longitudinal sectional view of one preferred embodiment of the invention.
Figure 2:
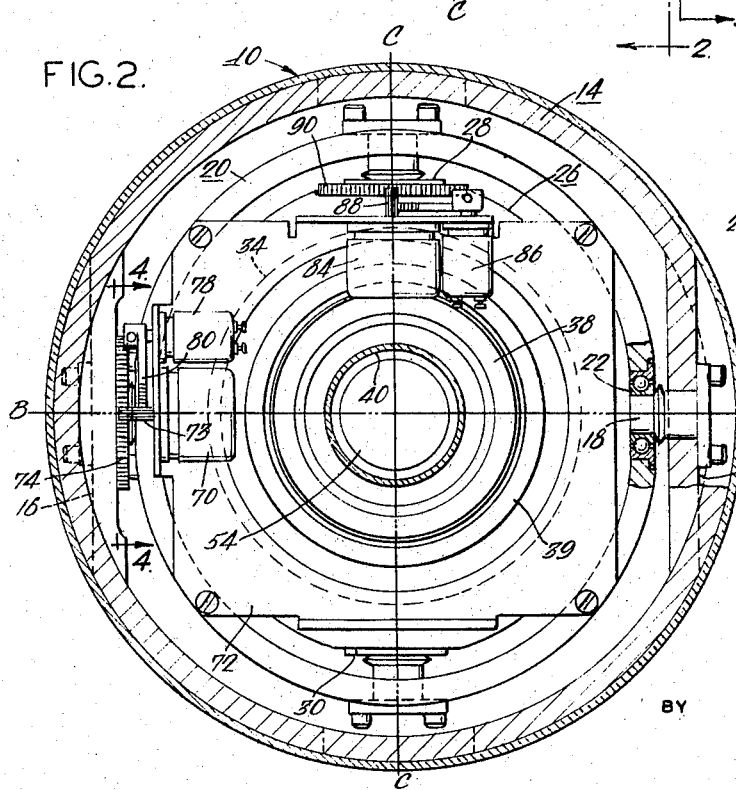
FIGURE 2 is a cross-sectional view of the apparatus shown in FIGURE 1, taken along lines 2—2.
Figure 4:
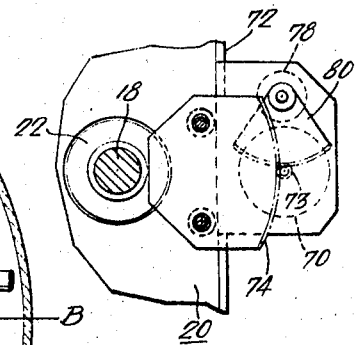
FIGURE 4 is an enlarged fragmentary view taken along lines 4—4 of FIGURE 2.

Referring now to the embodiment of the invention shown, by way of example only, in FIGURES 1-6 in which corresponding parts are indicated by corresponding numerals in the several drawings, the invention is illustrated as it may be applied to the caging of a gyro-stabilized platform for an electromagnetic-wave sensor in an air vehicle or space vehicle. Housing 10 may for example be the outer housing of a missile having at its front end a domed window 12 transmissive of electromagnetic radiations to be sensed. Housing 10 is cylindrical and circularly symmetrical about the nominal spin axis A—A of the gyro, corresponding to the fore-and-aft axis of the missile. A generally cylindrical supporting frame 14 is secured in any appropriate manner to the interior of housing 10. A pair of diametrically-opposite flattened or dimpled regions 16 (see FIGURE 2) are provided to facilitate mounting of a pair of diametrically-opposed coaxial outer gimbal pins 18 on which there is mounted an outer gimbal ring 20 by means of a pair of opposed bearings 22, one for each pivot pin. By way of example, the axis B—B about which the outer gimbal is free to rotate with respect to supporting frame 14 will be designated as the pitch axis, about which the missile may pitch, and the outer gimbal 20 may be designated the pitch gimbal. The pitch axis B—B is perpendicular to the nominal spin axis A—A.

On diametrically-opposed portions of pitch gimbal 20 are mounted a pair of coaxially-aligned gimbal pivot pins 24, 25; the latter pins support for rotation the inner gimbal ring 26 by means of appropriate bearings 28, 30. Inner gimbal ring 26 is therefore adapted to rotate freely about an axis C—C perpendicular to both axes A—A and B—B; the C—C axis will be designated as the yaw axis, about which yawing motion of the missile may take place.

Inner gimbal ring 26 is in the form of an open-sided hollow annulus. Inside the annular cavity in the inner gimbal ring 26 a gyro rotor 34 is mounted by means of bearings 36. A motor 38 mounted on the inner gimbal ring 26 cooperates with a hysteresis ring 39 on the gyro rotor 34 to spin the rotor at an appropriate high speed for gyroscopic action.

On the radially-inward side of the inner gimbal ring 26 there is secured a cylindrical casing 40 extending rearwardly and symmetrically about the axis A—A when the rotor is in its nominal position. Casing 40 provides physical protection for the sensor apparatus contained therein and in the present example is preferably made of mu-metal so as also to provide magnetic shielding for the sensor apparatus. The rearward end of casing 40 is closed by an electrical socket 42, which provides support at one end for the sensor apparatus contained in casing 40 as well as electrical connection to the wiring (not shown) for the camera tube contained therein. As will be described in detail hereinafter, the outer surface of casing 40 also provides a caging surface on which the caging apparatus operates to hold the inner gimbal 26 and the apparatus mounted thereon in a desired reference position or to release it so that it can pivot freely about two mutually perpendicular axes.

The sensor apparatus employed in the present example is effective to receive, and to produce electrical signals indicative of, electromagnetic radiations received by way of window 12. To this end, a sensor support 50 is secured in readily demountable fashion, by means of screws such as 52, to a front surface of inner gimbal ring 26, this sensor support comprising therefore a gyro-stabilized platform on which the sensor apparatus is mounted. The sensor in this case comprises a television camera tube 54, the sensitive axis of which is directed forwardly (to the left in FIGURE 1). The rear (right-hand end in FIGURE 1), of the camera tube is plugged into socket 42 and the front end is supported by a threaded support 58 screwed into sensor support 50. Suitable optical lens means 60 are also secured in support 58 to provide directionality of reception of electromagnetic waves; typically the optical lens means have maximum receptivity along the spin axis of the gyro, and accordingly the camera tube 54 "looks at" different directions depending upon the orientation of the camera tube as the inner gimbal 26 pivots.

Also shown are adjustable balancing weights 62 and 63 mounted on the front face of the outer gimbal ring 20, which may be adjusted longitudinally of the spin axis to secure balancing of the assembly about the center of support 64 after the sensor apparatus has been assembled.

To provide the capability of returning the axis of the sensor to its reference position, along the fore-and-aft line of the missile, or to move it to some desired off-axis position, means are preferably provided to produce torquing of the gyro about the pitch and yaw axes. For this purpose a pitch torque motor 70 is mounted on an upturned flange on a plate 72 extending across, and screwed to, the pitch gimbal 20. The drive shaft of pitch torque motor 70 rotates a spur gear 73 which meshes with a segmental gear 74 fixedly secured to supporting frame 14 (see particularly FIGURE 4). The arc of the toothed portion of segmental gear 74 is concentric with the pitch axis, so that operation of motor 70 applies a torque about the pitch axis in a direction determined by the direction of rotation of the motor. The extent of the motion of the pitch motor 70 is preferably indicated by conventional pitch potentiometer 78, also mounted on plate 72 and driven by another segmental gear 80 which also engages the pitch torque motor spur gear 73.

A corresponding yaw torque motor 84 and yaw potentiometer 86 are mounted on the plate 72, the spur gear 88 of the yaw torque motor engaging a segmental gear 90 fixedly secured to the inner or yaw gimbal 26. Operation of the yaw torque motor 84 therefore enables the producing of a control torque between the inner and outer gimbals about the yaw axis.

A domed back cover 92 secured to the supporting frame 14 completes the enclosure for the gyro-stabilized apparatus described above and separates it from the remainder of the missile, except for electrical leads (not shown) extending through the cover.

In operation of the portion of the apparatus thus far described, in the absence of torques applied by the torque motors the uncaged television camera tube 54 is gyroscopically fixed in its orientation in space by the action of the gyroscopic rotor 34 despite motion of the housing 10 about the pitch and yaw axes. FIGURE 1 shows in dotted outline the position of the optical system and television camera tube and casing relative to supporting frame 14 in one extreme of off-axis angular displacement about the pitch axis. This latter displacement from the nominal spin axis position A—A can be produced by upward tilting of the front of the housing 10 in space, or by operation of the pitch torque motor, for example. It will be understood that the television camera tube axis can also assume the oppositely-displaced position represented by line D—D in FIGURE 1 in which it is displaced in the opposite direction about the pitch axis from its nominal reference position, can deviate in either sense with respect to housing 10 about the yaw axis, and can in fact pivot about the center of support 64 in any direction due to its two degrees of freedom of rotation about the yaw and pitch axes.

The caging apparatus now to be described in detail is effective to hold the axis of the sensor apparatus in a reference position A—A along the fore-and-aft axis of the missile when desired, to release it so that it can pivot with respect to housing 10 about either or both of the pitch and yaw axes within predetermined angular limits, and to return it to its affirmative caged position when desired. This caging apparatus, in this example, is electrically operable to produce the desired caging or uncaging at will, to hold the sensor apparatus affirmatively in its reference position without application of electrical power, and to provide output electrical indications of whether the caging apparatus is in its caging or uncaging position.

In general, as represented particularly clearly in FIGURE 3, caging is accomplished by means of three pivoted arms 100, 102 and 104 shown in FIGURE 3 in full line in the caging position in which they bear radially inwardly against the exterior of the sensor apparatus casing 40 at 120° intervals around the periphery thereof. Uncaging is accomplished by causing the arms 100, 102 and 104 to pivot about pivots 106, 108 and 110, respectively, from the positions shown in full line to the positions shown in broken line in FIGURE 3. The three arms thus constitute a type of iris arrangement which can be contracted to bear against the outer caging surface of the casing 40 and hold the casing and the sensing apparatus in the reference caged position along axis A—A, or expanded to provide a central aperture spaced on all sides from the casing 40 when in its reference position and permitting substantial angular pivoting of the casing 40 about the center of support 64.

More particularly, the pivots 106, 108 and 110 are secured to the supporting frame 14 at points spaced by 120° about a circle concentric with the axis A—A. Each of the caging arms extends at least partially across the aperture through which casing 40 extends and is secured at its end remote from its pivot point by means of a slot provided therein which engages with a pin mounted on a ring-shaped gear; specifically, arms 100, 102 and 104 are provided, at the ends thereof remote from their respective pivots, with slots 120, 122 and 124 which are engaged by respective pins 126, 128 and 130, the latter pins being mounted at 120° intervals around a ring-shaped gear 134. The slots in the three arms lie in a common plane parallel to but spaced from the plane of their three pivots. Rotation of the gear 134 counterclockwise in FIGURE 3 produces the uncaging operation, while clockwise motion thereof causes the caged condition to occur.

The three points 111, 112 and 113 at which contact occurs between the caging arms and the casing 40 in the caged condition are substantially in the same plane. To permit this despite the fact that the arms cross each other, the caging arms 100, 102 and 104 are provided with respective double-bends 114, 116 and 118, whereby arm 100 extends over arm 104 but beneath arm 102, arm 102 extends over arm 100 but beneath arm 104, and arm 104 extends over arm 102 but beneath arm 100. Each of the caging arms is preferably, but not necessarily, concave toward the casing 40 and has a radius of curvature adjacent the point of contact with the casing 40 in the caged position which is large compared with the radius of curvature of the casing 40.

Ring-shaped gear 134 is externally toothed at 135 and rotatable in either desired direction about axis A—A by cage drive motor 138 through a drive gear 140 which engages with the ring-shaped gear (see FIGURE 5). It will be understood that the cage drive motor 138 is operated from an electrical source (not shown) in either direction as desired to produce caging or uncaging. The slots in the caging arms permit this action to occur, the respective pins on gear 134 sliding in their corresponding slots as the gear is turned.

FIGURE 6 shows in detail the pin-and-slot arrangement referred to above, and also the nature of a bearing arrangement preferably utilized to provide additional support for the ring-shaped gear 134. The pin 130 is in the form of a screw member which holds the following elements between its head 146 and a nut 148 at its opposite end: caging arm 104, a washer 150, a spacer 152, a pair of bearings 154, a second spacer 156 and gear 134, all of which are thereby loosely held together. The outer races of bearings 154 together provide an annular recess in which there is seated an annular boss 160 on a ring 162 on frame 14 concentric with the axis A—A. The dimensions of the various elements along pin 130 are such as to provide the desired location and operation of the caging arm 104, and the pair of bearings 154 provide low-friction support for the caging arm. It will be understood that each of the caging arms is substantially identical with the others, including their respective pivots and pin-and-slot arrangements, so that there are three such bearing arrangements such as 154, one for each caging arm.

To provide a positive yet readily releasable holding of the caging arms in their caging positions in the absence of electrical power supplied to the cage drive motor 138, there is employed a spring 170 affixed to supporting frame 14 adjacent the outer periphery of ring-shaped gear 134 and biased radially inwardly against said periphery. A detent 172 is provided in the portion of the outer periphery of ring-shaped gear 134 which is adjacent spring 170 when the ring-shaped gear has been turned to the fully-caged position. Accordingly, the spring 170 falls into the detent 172 in the fully-caged condition to maintain this condition until cage drive motor 138 affirmatively drives ring-shaped gear 134 to produce uncaging.

To provide electrical indications of the caged or uncaged condition of the caging arms, there are provided an uncage-indicating switch 176 and a cage-indicating switch 178. The switches are conveniently of conventional microswitch type. Switch 176 is supported from supporting frame 14 with its microswitch arm 177 biased normally open and radially inward toward the center of the ring-shaped gear. The slotted end of caging arm 102 is provided with a cam surface portion 180, and switch arm 177 and surface 180 are so positioned with respect to each other that, when the arm 102 is moved to its uncaged position shown in dotted outline, the cam surface 180 contacts switch arm 177 and closes to its associated electrical contacts 182, thereby completing an electrical circuit to provide an indication of the fully-uncaged condition. Switch 178 has a switch arm 186 which is biased normally open, but is held closed against contact 187 by a cam surface 188 on the slotted end of caging arm 100 when the caging arms are in the caged position; however, when arm 100 moves to its uncaged position shown in dotted outline, switch arm 186 moves to its open condition, thereby providing an indication of the uncaged condition.

Stop pins 190, 192 and 194 are also preferably secured to the supporting frame 14 in positions positively to arrest further opening or uncaging motion of the arms 100, 102 and 104, respectively, when they have reached their fully-uncaged position.

Accordingly it will be appreciated that there has been provided in this embodiment of the invention caging apparatus comprising three caging arms pivoted from the frame, which extend at least partially across an opening in the frame through which the camera tube casing extends so as to surround the casing, the arms being joined together near their opposite ends by a caging control in the form of a ring which can be rotated in either direction by means of the drive motor to pivot all of the caging arms together into simultaneous contact with the periphery of said casing to produce caging thereof, or to pivot all of the arms outwardly to an uncaged position which leaves a central aperture between the arms sufficiently large to permit substantial pivoting of the casing as is desired in the uncaged condition. The spring detent arrangement 170, 172 provides for affirmative holding of the caging arms in their caged condition, and switches 176 and 178 provide electrical output indications of the caged and uncaged conditions. Since the caging arms surround the casing on all sides, the casing can depart from this reference position in any angular direction and yet be picked up and returned to its caged position when the caging arms are pivoted to their casing position.

Referring now particularly to FIGURES 7–12, there is represented another embodiment of the invention employing a different arrangement of gimbal mounting, of support for the gyro rotor, of sensor apparatus and optics, and particularly a different form of the caging apparatus of the invention.

More particularly, FIGURE 7 shows schematically the outer housing 200 of a vehicle such as a missile having a domed window 202, in which the remainder of the apparatus shown is mounted. A supporting frame 204 is secured to housing 200 by mounting means such as 206 and a plurality of rubber grommet mounts such as 208. Supporting frame 204 has a pitch gimbal supporting portion 210 (see FIGURE 8) in which the pitch axis pivot pin 212 is mounted for free rotation about the pitch axis by means of suitable bearings 214 near each end thereof. The pitch gimbal 216 (see particularly FIGURE 11) supports three bearings 220 to mount the yaw axis pivot pins 222 for rotation about a yaw axis at right angles to the pitch axis. The pitch and yaw axes are understood to be both at right angles to the fore-and-aft axis E—E of the vehicle, and are indicated respectively by the axes F—F and G—G.

The annular gyro rotor 224 is supported on the yaw gimbal 226 by means of three 120°-displaced ball bearings 227 the outer races of which bear against an annular recess in the inner periphery of the rotor. A pair of gyro spin motors 228 and 229, also mounted on the yaw gimbal, apply a rim drive ot the interior surface of the rotor to provide its required spinning motion. This latter arrangement is shown in detail in FIGURE 10, wherein a rubber ring 230 mounted in a peripheral groove in drive pulley 232 contacts the inner annular surface of rotor 224; the same arrangement is provided for spin motor 228.

Both the yaw and pitch gimbals as well as the other structures are centrally apertured along the axis E—E, and the sensor apparatus, which is mounted on the yaw gimbal, extends through this central aperture generally along the axis E—E. In this example the sensor apparatus comprises electromagnetic-wave lens means 236 having a directional axis and a television camera apparatus 238, both enclosed in a protective casing 239. In this example the lens means constitutes a "folded" optical system which receives electromagnetic waves through window 202 at the left in FIGURE 7 and transmits the waves to the right-hand end of the optical system where they are reflected back against the right-hand side or end of the camera tube.

In the present example the reference caged position of the axis of the sensor apparatus with respect to yawing motion is in the plane of the fore-and-aft axis of the missile and of the nominal spin axis of the gyro, as shown in full line in FIGURE 8; when uncaged, it is free to move angularly about the yaw axis to extreme positions indicated in broken line in FIGURE 8. However, with respect to the pitch axis the reference or caged position is one in which the optical axis is directed downwardly by about 15°, i.e. so that the rear, or right-hand, end of the sensor apparatus and its casing is pitched upwardly by 15° along the axis H—H in FIGURE 7. When uncaged, angular motion about the pitching axis may take place between the two positions represented in broken line in FIGURE 7 and by the axes J—J and K—K.

To provide torquing about the pitch axis, a pair of pitch torque motors 240 and 242 are employed, both of which are secured to the supporting frame 204. The drive shafts of the motors 240 and 242 rotate respective spur gears 244 and 246, which in turn engage the toothed regions 248 and 250 of the segmental gears 252 and 254. Segmental gears 252 and 254 are secured to opposite ends of the pitch axis pivot pin 212 and the toothed portions 248 and 250 are concentric with the pitch axis, so that operation of the motors 240 and 242 provides torquing about the pitch axis with respect to the supporting frame. A suitable torque axis potentiometer 260 is coupled to segmental gear 252 by a gear 262 to provide indications of the angular position of the pitch axis pivot pin.

To provide torquing about the yaw axis, a pair of yaw-axis torque motors 270 and 271 are employed (see FIGURE 11), which operate through a gear train 272 to drive the yaw axis pivot pin 222 with respect to the pitch-gimbal 216. A yaw axis potentiometer 273 is also gear-coupled to the yaw axis pivot pin.

As is particularly clear from FIGURES 9 and 12, the rearwardly-extending cylindrical surface of the casing 239 surrounding the lens means and the television camera apparatus is not circularly cylindrical as in the embodiment of FIGURE 1, but rather has the cross-section of a rectangle with semicircularly rounded ends in regions where caging is to be accomplished. The longer axis of the cross-section of the casing 239 is parallel to the yaw axis. The caging apparatus utilized in this example is shown in FIGURES 7, 8 and 12–14.

Referring particularly to FIGURE 12, the two caging arms 300 and 302 employed are shown in full line in their uncaged position and are shown in dotted outline in their caged positions at 300A and 302A, respectively. Caging arm 300 is pivoted in a plane normal to the fore-and-aft axis of the missile by means of a pivot 306 attached to the supporting frame 204. The details of the pivot arrangement are shown in FIGURE 13, wherein it is shown that the arm 300 pivots between bearing surfaces provided by a washer 307 on one side and a flange on a bushing 308, the assembly being held to the supporting frame 204 by a screw 310. Caging arm 302 is supported on a similar pivot 312. The two pivots 306 and 312 are located near the periphery of the supporting frame 204 on diametrically-opposite sides of a circle concentric with the fore-and-aft axis of the missile. Arms 300 and 302 are both generally arcuate and concave toward each other and toward the casing 239.

The ends of the arms 300 and 302 opposite their respective pivots 306 and 312 are joined together and moved simultaneously to pivot the arms by means of a caging control ring-shaped gear 320. Gear 320 is supported by the three sets of bearings 324, 326 and 328

(see FIGURE 12 for example) mounted from frame 204 and having their outer races in contact with the inner periphery of the ring-shaped gear 320. Caging arm 302 is secured to the ring-shaped gear 320 by means of a slot 330 engaging with a pin 332, the pin 332 being in the form of a screw threaded into ring-shaped gear 320, as shown in FIGURE 14. A suitable spacer 340 and washers 342 and 344 provide proper positioning and sliding capture of arm 302. The opposite end of arm 300 from its pivot 306 is provided with a similar arrangement of pin and slot. The two arrangements of pins and slots for the two arms 300 and 302 are diametrically opposite each other with respect to the fore-and-aft axis of the missile and equally spaced on opposite sides thereof.

The caging arms 300 and 302 are stepped at 346 and 348, respectively, so that the portion of each arm near its pivot can pass freely over the portion of the other arm near its slotted end during pivoting of the arms.

The outer surface of ring-shaped gear 320 is toothed and positioned to be engaged by a driving gear 350 (FIGURE 8) which is rotated by a cage drive motor 352 mounted on the supporting frame 204.

Referring particularly to FIGURE 12, when the drive motor 352 is operated in the direction to rotate the ring-shaped gear 320 clockwise as viewed in FIGURE 12, the arms 300 and 302 are moved to their outward, uncaged position so as to leave open a large central aperture to permit substantial pivoting of the casing 239 and the sensor apparatus associated therewith, during normal use of the equipment. When it is desired to cage the sensor apparatus, the motor is operated in the opposite direction to rotate the ring-shaped gear counterclockwise and thereby move the arms 300 and 302 to the broken-line positions 300A and 302A in FIGURE 12 for which they simultaneously contact opposite sides of the sensor apparatus casing 239 in the caged position; the caged position of the casing is represented in broken line at 239A. Each of the arms 300 and 302 is provided with a sharply-angled portion near the center of its concave arcuate surface, at which the radius of curvature is small compared with that of the portion of the casing to be contacted, whereby each arm contacts the semi-cylindrical portion of the casing at two points, as at 356, 357. With this arrangement the casing when caged is affirmatively held not only against motion along the pitch axis but is also restrained from pivoting about the yaw axis.

There has therefore been provided, in the last-described embodiment of the invention, apparatus which provides motor-driven caging and uncaging of the gyro-stabilized sensor apparatus and, if the sensor apparatus is initially angularly-displaced from its caged position, picks up the sensor apparatus during the caging operation and moves it to its caged position, the entire arrangement being compact and simple.

Other numbers, shapes and positions of caging arms may be used in other embodiments of the invention as dictated by the shape of the member to be caged, the position of the available supporting structure for the arm pivots, and the desired functions of the arms in the particular application.

Accordingly, while the invention has been described with particular reference to specific embodiments thereof, it may be embodied in any of a variety of forms differing from those specifically described and claimed without departing from the spirit and scope of the invention as defined by the appended claims.

What is claimed is:

1. In combination with gyroscope apparatus having an outer gimbal structure pivotably mounted on a frame, an inner gimbal structure pivotably mounted on said outer gimbal structure, a gyro rotor mounted for rapid rotation on said inner gimbal structure, and a member fixed to said inner gimbal structure and providing a caging surface engageable to constrain said member against pivoting about the axes of pivot of said gimbal structure, caging apparatus comprising:

a plurality of caging arms pivotably mounted on said frame at different pivot points circumferentially spaced from each other about said caging surface and extending inwardly adjacent different sides of said caging surface so that said arms surround said caging surface and are pivotable parallel to each other into and out of simultaneous engagement with different portions of said caging surface to effect caging and uncaging thereof, the ends of said arms remote from said pivot points extending beyond the portions thereof which engage said caging surface;

caging control means having portions disposed about said caging surface;

means mounting said caging control means for rotation about an axis in said frame and in a plane parallel to the plane of pivoting of each of said arms; and means coupling said portions of said caging control means to said ends of said arms remote from said pivot points for providing said caging and uncaging in response to rotation of said caging control means.

2. The apparatus of claim 1, in which said coupling means comprise pin-and-slot couplings between said arm ends and said portions of said caging control means.

3. The apparatus of claim 2, in which each of said couplings comprises a pin coupling one of said arm ends to one of said portions of said caging control means to drive said arms in response to rotation of said caging control means, and in which said apparatus comprises roller bearing means mounting said caging control means for rotation about said axis.

4. The apparatus of claim 3, in which said roller bearing means comprise a roller bearing mounted on and surrounding each of said pins and rotatable about the axis thereof, and in which said apparatus comprises a member having a circular surface fixed on said frame on which said roller bearings are adapted to roll.

5. The apparatus of claim 4, in which said arms and roller bearings are each three in number and equiangularly spaced about said circular surface.

6. The apparatus of claim 3, in which said roller bearing means comprise a plurality of roller bearings each mounted to rotate about a different axis on said frame, and in which said caging control means has a circular surface on which said roller bearings are adapted to roll, said roller bearings being spaced about said circular surface to provide support therefor.

7. The apparatus of claim 6, in which said roller bearings are three in number and equiangularly-spaced about said circular surface.

References Cited

UNITED STATES PATENTS

| | | | |
|---|---|---|---|
| 1,918,082 | 7/1933 | Carlson | 74—5.1 |
| 2,207,717 | 7/1940 | Carter | 74—5.1 |
| 2,247,142 | 6/1941 | Anscott et al. | 74—5.1 |
| 2,280,116 | 4/1942 | Carlson | 74—5.1 |
| 2,564,772 | 8/1951 | Stone | 74—5.1 |

FOREIGN PATENTS 562,688   7/1944   Great Britain.

FRED C. MATTERN, Jr., Primary Examiner

M. ANTONAKAS, Assistant Examiner